July 1, 1930. P. AURICH 1,769,171
CONVEYING DEVICE
Filed Oct. 15, 1927
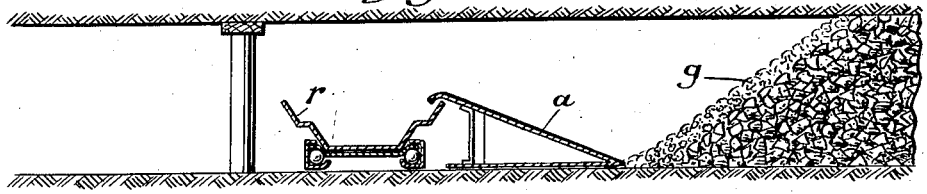
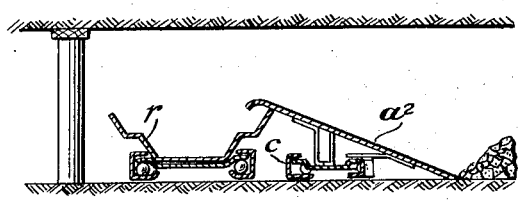
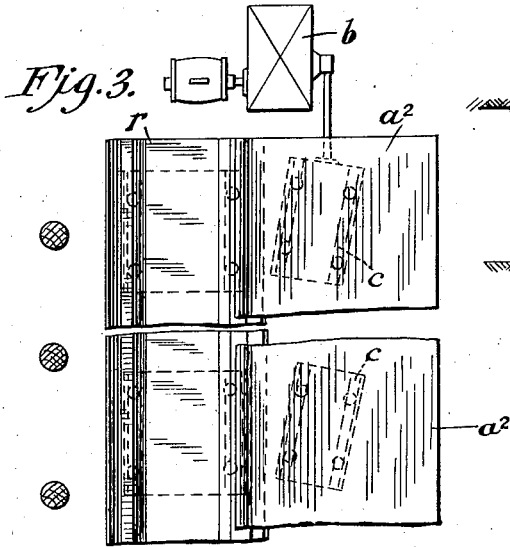
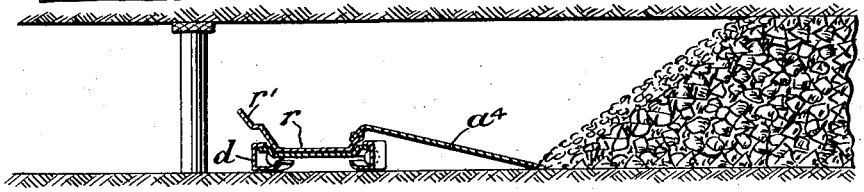
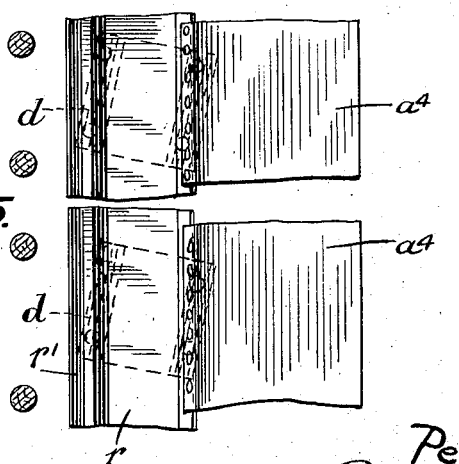
Inventor.
Peter Aurich
By Fetherstonhaugh & Co
ATTORNEYS.

Patented July 1, 1930

1,769,171

UNITED STATES PATENT OFFICE

PETER AURICH, OF BOCHUM, GERMANY, ASSIGNOR TO THE FIRM GEBR. EICKHOFF, MASCHINENFABRIK, OF BOCHUM, GERMANY

CONVEYING DEVICE

Application filed October 15, 1927, Serial No. 226,482, and in Germany July 27, 1927.

The invention relates to conveying devices intended to convey loose goods, such as coal or rocks in mines and the like, and consists substantially of a shaking conveyer and a means by which it is completed in such a manner, that the supply of the material to be conveyed by it is considerably facilitated. This is obtained according to the invention by one or more ramps being arranged laterally of the shaking conveyer, which ramps allow of the material to be conveyed to glide onto the conveyer without any lifting power being required to this end. The saving of power obtained in this way may be further increased by imparting to the said ramp or ramps likewise a shaking motion, this motion being produced either by providing a special driving appliance for the ramp or by connecting the latter to the shaking conveyer in such a manner, that the ramp takes part in the reciprocating motion of the conveyer.

In order to allow of the invention to be more easily understood, some preferred embodiments of same are illustrated in the drawings which accompany and form part of this specification.

In these drawings:

Fig. 1 is a sectional view of the first embodiment of the conveying device,

Fig. 2 is a similar view of the second embodiment,

Fig. 3 is a top view of the device shown in Fig. 2,

Fig. 4 is a sectional view of a third embodiment, and

Fig. 5 is a top view of the device shown in Fig. 4.

Referring first to Fig. 1, $r$ denotes a shaking conveyer of known design. One or more ramps $a$ are placed laterally between the shaking conveyer $r$ and the material $g$ to be conveyed. In this embodiment the ramp $a$ is stationary.

Figs. 2 and 3 show a conveyer $r$ and a ramp $a^2$ which in this case has its own running brackets $c$ enabling it to execute a to and fro motion, and its own driving device $b$ to produce said motion. Advantageously a motion is imparted to the ramp $a^2$ from the driving device $b$, which is directed obliquely toward the shaking conveyer $r$, this being effected in the simplest manner by arranging the brackets $c$ in a correspondingly oblique direction.

In the embodiment illustrated in Figs. 4 and 5 the ramp $a^4$ has no brackets, but is connected with the conveyer $r$ or may be made integral with the latter, so that it partakes of its reciprocating motion. In this case too the ramp has advantageously imparted to it a motion that is directed obliquely to the longitudinal direction of the conveyer, this being obtained in simplest manner by an oblique arrangement of the running brackets $d, d$ of the conveyer $r$ itself, so that the latter executes a reciprocating motion together with the ramp $a^4$, connected to it, which motion is directed obliquely to its longitudinal axis. This arrangement may be provided also in case the ramp is fitted with its own drive.

As further shown in Fig. 4, the cheek $r^1$, located opposite the ramp $a^4$, of the conveyer is preferably extended upwardly.

Of course the ramp does not need to ascend in every case toward the conveyer, as illustrated, but may, in the contrary, descend toward the latter, according to the conditions prevailing in the mine or the like.

I claim:

1. A conveying device consisting of a longitudinally reciprocable shaking conveyer and a laterally extending ramp arranged at one of the longitudinal sides of said conveyer and adapted to feed to it the material to be conveyed.

2. A conveying device consisting of a longitudinally reciprocable shaking conveyer and a laterally extending ramp arranged at one of the longitudinal sides of said conveyer and adapted to feed to it the material to be conveyed, and means for imparting to said ramp a shaking motion.

3. A conveying device consisting of a longitudinally reciprocable shaking conveyer and a laterally extending ramp rigidly connected to one of the longitudinal sides of said conveyer and adapted to feed to it the material to be conveyed.

4. A conveying device consisting of a longitudinally reciprocable shaking conveyer and a laterally extending ramp arranged at one of the longitudinal sides of said conveyer and adapted to feed to it the material to be conveyed, and means for imparting to said ramp a shaking motion directed obliquely to the longitudinal axis of said conveyer.

5. A conveying device consisting of a longitudinally reciprocable shaking conveyer and a ramp arranged laterally of said conveyer and adapted to feed to it the material to be conveyed, running brackets on said ramp and fixed guideways therefor, said brackets and guideways being arranged obliquely to the longitudinal axis of said conveyer, and means for imparting a shaking motion to said ramp.

6. A conveying device consisting of a longitudinally reciprocable shaking conveyer and a ramp rigidly connected to and arranged laterally of said conveyer and adapted to feed to it the material to be conveyed, and means for imparting to said ramp a shaking motion directed obliquely to the longitudinal axis of said conveyer.

7. A conveying device consisting of a longitudinally reciprocable shaking conveyer and a ramp rigidly connected to and arranged laterally of said conveyer and adapted to feed to it the material to be conveyed, and means for imparting to said ramp and to said conveyer a common shaking motion directed obliquely to the longitudinal axis of said conveyer.

8. A shaking device consisting of a longitudinally reciprocable shaking conveyer and a ramp rigidly connected to and arranged laterally of said conveyer and adapted to feed to it the material to be conveyed, running brackets on said conveyer and fixed guideways therefor, said brackets and guideways being arranged obliquely to the longitudinal axis of said conveyer.

9. A conveying device consisting of a longitudinally reciprocable shaking conveyer having longitudinal lateral cheeks, and a ramp arranged laterally of said conveyer and adapted to feed to it the material to be conveyed, the cheek, remote from said ramp, of said conveyer extending upwardly to a higher level than the other cheek.

In testimony whereof, I have signed my name to this specification this 23rd day of September, 1927.

PETER AURICH.